US012559625B2

(12) United States Patent
Ito et al.

(10) Patent No.: US 12,559,625 B2
(45) Date of Patent: Feb. 24, 2026

(54) POLYAMIDE RESIN COMPOSITION

(71) Applicant: UBE Corporation, Ube (JP)

(72) Inventors: Toru Ito, Ube (JP); Yasuharu Fukui, Ube (JP)

(73) Assignee: UBE CORPORATION, Ube (JP)

( * ) Notice: Subject to any disclaimer, the term of this patent is extended or adjusted under 35 U.S.C. 154(b) by 812 days.

(21) Appl. No.: 17/797,674

(22) PCT Filed: Feb. 3, 2021

(86) PCT No.: PCT/JP2021/003889
§ 371 (c)(1),
(2) Date: Aug. 4, 2022

(87) PCT Pub. No.: WO2021/157605
PCT Pub. Date: Aug. 12, 2021

(65) Prior Publication Data
US 2023/0076659 A1 Mar. 9, 2023

(30) Foreign Application Priority Data
Feb. 5, 2020 (JP) ................................. 2020-017635

(51) Int. Cl.
*C08L 77/06* (2006.01)
(52) U.S. Cl.
CPC .................................... *C08L 77/06* (2013.01)
(58) Field of Classification Search
CPC ........... C08K 3/16; C08K 3/346; C08L 51/06; C08L 77/02; C08L 77/06
See application file for complete search history.

(56) References Cited

U.S. PATENT DOCUMENTS

| | | |
|---|---|---|
| 2009/0203845 A1 | 8/2009 | Fukui et al. |
| 2011/0014486 A1 | 1/2011 | Sakamoto et al. |
| 2013/0261245 A1 | 10/2013 | Tomic et al. |
| 2014/0034654 A1 | 2/2014 | Dullaert et al. |
| 2017/0335999 A1 | 11/2017 | Ochiai et al. |
| 2018/0179372 A1 | 6/2018 | Ellul |
| 2019/0023898 A1 | 1/2019 | Yasui |

FOREIGN PATENT DOCUMENTS

| | | |
|---|---|---|
| CN | 101977998 A | 2/2011 |
| CN | 107075251 A | 8/2017 |
| EP | 4 053 199 A1 | 9/2022 |
| JP | 2008-69190 A | 3/2008 |
| JP | 2009-191871 A | 8/2009 |
| JP | 2013-532748 A | 8/2013 |
| JP | 2017-201213 A | 11/2017 |
| WO | WO 2007/046541 A1 | 4/2007 |
| WO | WO 2017/135215 A1 | 8/2017 |

OTHER PUBLICATIONS

Chinese Office Action and Search Report for Chinese Application No. 202180013063.9, dated Feb. 1, 2024, with an English translation.
Chinese Office Action and Search Report for Chinese Application No. 202180013063.9, dated Jun. 15, 2023.
Extended European Search Report for European Application No. 21750930.6, dated Feb. 13, 2024.
International Search Report for PCT/JP2021/003889 (PCT/ISA/210) mailed on Mar. 30, 2021.
Korean Office Action for Korean Application No. 10-2022-7030018, dated Oct. 28, 2025, with English translation.

*Primary Examiner* — Ana L. Woodward
(74) *Attorney, Agent, or Firm* — Birch, Stewart, Kolasch & Birch, LLP

(57) ABSTRACT

The present invention provides a polyamide resin composition that can give a molded article having a low hydrogen gas permeability coefficient and exhibiting a favorable nominal tensile strain at break at a low temperature (−40° C.), and pertains to a polyamide resin composition including polyamide resins (A), an impact modifier (B) and an inorganic compound (C), wherein the polyamide resins (A) include an aliphatic homopolyamide resin (A-1) and an aliphatic copolyamide resin (A-2), and the content of the inorganic compound (C) with respect to 100 parts by weight of the impact modifier (B) is 1.60 to 3.00 parts by weight.

13 Claims, No Drawings

POLYAMIDE RESIN COMPOSITION

TECHNICAL FIELD

The present invention relates to a polyamide resin composition.

BACKGROUND ART

Polyamide resins are known as resins having excellent gas barrier properties. There is a demand for gas-barrier polyamide resin compositions in various applications. Patent Literature 1 discloses that a polyamide resin composition including polyamide 6, polyamide 6/66 and an impact modifier (maleic anhydride-modified EBR) has high gas barrier properties and is excellent in impact resistance at low temperatures. Furthermore, Patent Literature 2 discloses that a polyamide resin that includes an aliphatic polyamide, an aliphatic copolyamide composed of three or more kinds of monomers, an impact modifier and an antioxidant exhibits a good melt viscosity offering excellent blow moldability, and has excellent mechanical physical properties and heat welding properties.

CITATION LIST

Patent Literature

Patent Literature 1: Japanese Patent Application Kokai Publication No. 2009-191871
Patent Literature 2: WO 2017/135215

SUMMARY OF INVENTION

Technical Problem

Unfortunately, polyamide resin compositions such as those disclosed in Patent Literatures 1 and 2 often encounter difficulties in giving molded articles that concurrently satisfy gas barrier properties against hydrogen gas, and the nominal tensile strain at break at a low temperature (−40° C.). It is therefore an object of the present invention to provide a polyamide resin composition that can give a molded article having a low hydrogen gas permeability coefficient and exhibiting a favorable nominal tensile strain at break at a low temperature (−40° C.).

Solution to Problem

The present invention pertains to the following [1] to [6].
[1] A polyamide resin composition comprising polyamide resins (A), an impact modifier (B) and an inorganic compound (C), wherein
the polyamide resins (A) include an aliphatic homopolyamide resin (A-1) and an aliphatic copolyamide resin (A-2), and
the content of the inorganic compound (C) with respect to 100 parts by weight of the impact modifier (B) is 1.60 to 3.00 parts by weight.
[2] The polyamide resin composition of [1], wherein the content of the aliphatic copolyamide resin (A-2) with respect to 100 parts by weight of the total of the aliphatic homopolyamide resin (A-1) and the aliphatic copolyamide resin (A-2) is 5.00 to 40.00 parts by weight.
[3] The polyamide resin composition of [1] or [2], wherein the inorganic compound (C) is a combination of a metal halide (C-1) and an inorganic compound (C-2) other than metal halides, and the content of the metal halide (C-1) with respect to 100 parts by weight of the inorganic compounds (C) is 10 to 90 parts by weight.
[4] The polyamide resin composition of any of [1] to [3], wherein the inorganic compound (C) comprises a metal halide and talc.
[5] The polyamide resin composition of any of [1] to [4], wherein the aliphatic homopolyamide resin (A-1) has a relative viscosity of 1.8 to 5.0 as measured with respect to a 1 wt % solution in 96% sulfuric acid at 25° C. in accordance with JIS K 6920.
[6] The polyamide resin composition of any of [1] to [5], wherein the aliphatic copolyamide resin (A-2) has a relative viscosity of 1.8 to 5.0 as measured with respect to a 1 wt % solution in 96% sulfuric acid at 25° C. in accordance with JIS K 6920.

Advantageous Effects of Invention

The polyamide resin composition provided according to the present invention can give a molded article having a low hydrogen gas permeability coefficient and exhibiting a favorable nominal tensile strain at break at a low temperature (−40° C.).

DESCRIPTION OF EMBODIMENTS

In the present specification, a plurality of substances may correspond to a single component in a composition. In such cases, the content of that component in the composition indicates the total amount of the substances present in the composition unless otherwise specified.
[Polyamide Resin Compositions]
A polyamide resin composition comprises polyamide resins (A), an impact modifier (B) and an inorganic compound (C), wherein the polyamide resins (A) include an aliphatic homopolyamide resin (A-1) and an aliphatic copolyamide resin (A-2), and the content of the inorganic compound (C) with respect to 100 parts by weight of the impact modifier (B) is 1.60 to 3.00 parts by weight. By controlling the contents of the impact modifier and the inorganic compound (such as talc and an inorganic heat resistant agent) to the specified weight ratio, a low hydrogen gas permeability coefficient and a favorable nominal tensile strain at break at a low temperature can be attained concurrently. Here, the "favorable nominal tensile strain at break at a low temperature" means that the nominal tensile strain at break at −40° C. is satisfactory. The polyamide resin composition has a low hydrogen gas permeability coefficient when shaped into an article. That is, a molded article of the polyamide resin composition has excellent gas barrier properties.
<<Polyamide Resins (A)>>
The polyamide resins (A) include an aliphatic homopolyamide resin (A-1) and an aliphatic copolyamide resin (A-2). The combination of the aliphatic homopolyamide resin (A-1) and the aliphatic copolyamide resin (A-2) imparts good gas barrier properties and excellent low-temperature impact resistance to a molded article.
<Aliphatic Homopolyamide Resins (A-1)>
The aliphatic homopolyamide resin (A-1) is an aliphatic polyamide resin composed of a single kind of a monomer component. For example, the monomer component constituting the aliphatic polyamide resin may be a combination of an aliphatic diamine and an aliphatic dicarboxylic acid, or may be a lactam or an aminocarboxylic acid. When the monomer component constituting the aliphatic polyamide resin is a combination of an aliphatic diamine and an aliphatic dicarboxylic acid, the combination of a single aliphatic diamine and a single aliphatic dicarboxylic acid is regarded as a single monomer component.

Thus, examples of the aliphatic homopolyamide resins (A-1) include aliphatic homopolyamide resins composed of a combination of a single aliphatic diamine and a single aliphatic dicarboxylic acid, aliphatic homopolyamide resins composed of a lactam, and aliphatic homopolyamide resins composed of an aminocarboxylic acid. Here, the number of carbon atoms in the aliphatic diamine is preferably 2 to 20, and particularly preferably 4 to 12. The number of carbon atoms in the aliphatic dicarboxylic acid is preferably 2 to 20, and particularly preferably 6 to 12. The number of carbon atoms in the lactam is preferably 6 to 12. The number of carbon atoms in the aminocarboxylic acid is preferably 6 to 12.

Examples of the aliphatic diamines include ethylenediamine, tetramethylenediamine, pentamethylenediamine, hexamethylenediamine, peptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine and eicosanediamine. Examples of the aliphatic dicarboxylic acids include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid.

Examples of the combinations of the aliphatic diamine and the aliphatic dicarboxylic acid include a combination of hexamethylenediamine and adipic acid, a combination of hexamethylenediamine and sebacic acid, and a combination of hexamethylenediamine and dodecanedioic acid. The combination is preferably used as an equimolar salt.

Examples of the lactams include ε-caprolactam, enantholactam, undecanelactam, dodecanelactam, α-pyrrolidone and α-piperidone. Examples of the aminocarboxylic acids include 6-aminocaproic acid, 7-aminoheptanoic acid, 9-aminononanoic acid, 11-aminoundecanoic acid and 12-aminododecanoic acid. From the point of view of productivity, the lactam is preferably ε-caprolactam, undecanelactam or dodecanelactam.

Specific examples of the aliphatic homopolyamide resins (A-1) include polycaprolactam (polyamide 6), polyenantholactam (polyamide 7), polyundecanelactam (polyamide 11), polylauryllactam (polyamide 12), polyhexamethyleneadipamide (polyamide 66), polytetramethylenedodecamide (polyamide 412), polypentamethyleneazelamide (polyamide 59), polypentamethylenesebacamide (polyamide 510), polypentamethylenedodecamide (polyamide 512), polyhexamethyleneazelamide (polyamide 69), polyhexamethylenesebacamide (polyamide 610), polyhexamethylenedodecamide (polyamide 612), polynonamethyleneadipamide (polyamide 96), polynonamethyleneazelamide (polyamide 99), polynonamethylenesebacamide (polyamide 910), polynonamethylenedodecamide (polyamide 912), polydecamethyleneadipamide (polyamide 106), polydecamethyleneazelamide (polyamide 109), polydecamethylenedecamide (polyamide 1010), polydecamethylenedodecamide (polyamide 1012), polydodecamethyleneadipamide (polyamide 126), polydodecamethyleneazelamide (polyamide 129), polydodecamethylenesebacamide (polyamide 1210), polydodecamethylenedodecamide (polyamide 1212) and polydodecamethyleneoxamide (polyamide 122).

From the point of view of productivity, the aliphatic homopolyamide resin (A-1) is preferably one or more selected from the group consisting of polyamide 6, polyamide 66, polyamide 610, polyamide 612, polyamide 11 and polyamide 12, and is particularly preferably polyamide 6 and/or polyamide 66.

The relative viscosity of the aliphatic homopolyamide resin (A-1) is not particularly limited. The relative viscosity measured with respect to a 1 wt % solution of the aliphatic homopolyamide resin (A-1) in 96% sulfuric acid at 25° C. in accordance with JIS K 6920 is preferably 1.8 to 5.0, and particularly preferably 1.8 to 4.5. The relative viscosity is preferably measured as described above. When, however, the aliphatic homopolyamide resin (A-1) is a mixture of aliphatic homopolyamide resins, and the relative viscosities and the mixing ratio of the resins are known, the relative viscosity of the total of the aliphatic homopolyamide resins (A-1) may be the average value determined by multiplying the respective relative viscosities by the mixing ratio and combining the products.

A production device for the aliphatic homopolyamide resin (A-1) includes a known polyamide production device such as a batch reaction vessel, a single-tank or multi-tank continuous reactor, a tubular continuous reactor, or a kneading reaction extruder such as a single-screw kneading extruder or a twin-screw kneading extruder. The polymerization method may be a known method such as melt polymerization, solution polymerization or solid-phase polymerization. The polymerization may be performed while repeating pressure control to atmospheric pressure, reduced pressure and increased pressure. These polymerization methods may be performed singly or may be appropriately combined.

The aliphatic homopolyamide resins (A-1) may be used singly, or two or more may be used in combination.

<Aliphatic Copolyamide Resins (A-2)>

The aliphatic copolyamide resin (A-2) is an aliphatic polyamide resin composed of two or more kinds of monomer components. That is, the aliphatic copolyamide resin (A-2) may be an aliphatic copolyamide resin that is a copolymer of two or more kinds of monomers selected from the group consisting of combinations of an aliphatic diamine and an aliphatic dicarboxylic acid, lactams and aminocarboxylic acids.

Examples of the monomer components for constituting the aliphatic copolyamide resin (A-2) include the monomer components described hereinabove with respect to the aliphatic homopolyamide resin (A-1).

Specific examples of the aliphatic copolyamide resins (A-2) include caprolactam/hexamethylenediaminoadipic acid copolymer (polyamide 6/66), caprolactam/hexamethylenediaminoazelaic acid copolymer (polyamide 6/69), caprolactam/hexamethylenediaminosebacic acid copolymer (polyamide 6/610), caprolactam/hexamethylenediaminoundecanoic acid copolymer (polyamide 6/611), caprolactam/hexamethylenediaminododecanoic acid copolymer (polyamide 6/612), caprolactam/aminoundecanoic acid copolymer (polyamide 6/11), caprolactam/lauryllactam copolymer (polyamide 6/12), caprolactam/hexamethylenediaminoadipic acid/lauryllactam copolymer (polyamide 6/66/12), caprolactam/hexamethylenediaminoadipic acid/hexamethylenediaminosebacic acid copolymer (polyamide 6/66/610), caprolactam/hexamethylenediaminoadipic acid/hexamethylenediaminododecanedicarboxylic acid copolymer (polyamide 6/66/612) and hexamethylenediaminoadi-pic acid/caprolactam copolymer (polyamide 66/6).

From the point of view of productivity, the aliphatic copolyamide resin (A-2) is preferably one or more selected from the group consisting of polyamide 6/66, polyamide 6/12 and polyamide 6/66/12, and is particularly preferably polyamide 6/66.

The relative viscosity of the aliphatic copolyamide resin (A-2) is not particularly limited. The relative viscosity measured with respect to a 1 wt % solution of the aliphatic copolyamide resin (A-2) in 96% sulfuric acid at 25° C. in accordance with JIS K 6920 is preferably 1.8 to 5.0, and particularly preferably 2.0 to 4.5. The relative viscosity is preferably measured as described above. When, however, the aliphatic copolyamide resin (A-2) is a mixture of ali-phatic copolyamide resins, and the relative viscosities and the mixing ratio of the resins are known, the relative viscosity of the total of the aliphatic copolyamide resins (A-2) may be the average value determined by multiplying the respective relative viscosities by the mixing ratio and combining the products.

A production apparatus and A polymerization method for the aliphatic copolyamide resin (A-2) include those similar to the production apparatus and the polymerization method described hereinabove with respect to the aliphatic homopo-lyamide resin (A-1).

The aliphatic copolyamide resins (A-2) may be used singly, or two or more may be used in combination.

<Additional Polyamide Resins>

The polyamide resins (A) may include an additional polyamide resin (A-3) other than the aliphatic homopoly-amide resin (A-1) and the aliphatic copolyamide resin (A-2). Examples of the additional polyamide resins (A-3) include polyamide resins that are copolymers having a functional group such as an alicyclic group or an aromatic group in the main chain or in a side chain. Here, examples of the monomer components for constituting the additional poly-amide resin (A-3) include combinations of an aliphatic or aromatic diamine and an aliphatic or aromatic dicarboxylic acid, lactams and aminocarboxylic acids. The additional polyamide resin (A-3) is preferably a copolyamide resin that includes an aromatic diamine or an aromatic dicarboxylic acid as a monomer component. The additional polyamide resin (A-3) may be produced by any known polymerization method without limitation.

Examples of the dicarboxylic acids for constituting the additional polyamide resin (A-3) include aromatic dicarbox-ylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedi-oxydiacetic acid, 1,3-phenylenedioxydiacetic acid, diben-zoic acid, 4,4'-oxydibenzoic acid, diphenylmethane-4,4'-dicarboxylic acid, diphenylsulfone-4,4'-dicarboxylic acid and 4,4'-biphenyldicarboxylic acid; and alicyclic dicarbox-ylic acids such as 1,3-cyclopentanedicarboxylic acid and 1,4-cyclohexanedicarboxylic acid.

Examples of the diamines for constituting the additional polyamide resin (A-3) include alicyclic diamines such as cyclohexanediamine, methylcyclohexanediamine and iso-phoronediamine; and aromatic diamines such as p-phe-nylenediamine, m-phenylenediamine, p-xylenediamine, m-xylenediamine, 4,4'-diaminodiphenylmethane, 4,4'-di-aminodiphenylsulfone and 4,4'-diaminodiphenyl ether.

Specific examples of the additional polyamide resins (A-3) include isophthalic acid/terephthalic acid/hexameth-ylenediamine/bis(3-methyl-4-aminocyclohexyl) methane polycondensate, terephthalic acid/2,2,4-trimethylhexamethylenediamine/2,4,4-trimethylhexamethylenediamine poly-condensate, isophthalic acid/bis(3-methyl-4-aminocyclo-hexyl)methane/ω-laurolactam polycondensate, isophthalic acid/terephthalic acid/hexamethylenediamine polyconden-sate (polyamide 6T/6I), isophthalic acid/2,2,4-trimethylhex-amethylenediamine/2,4,4-trimethylhexamethylenediamine polycondensate, isophthalic acid/terephthalic acid/2,2,4-trimethylhexamethylenediamine/2,4,4-trimethylhexameth-ylenediamine polycondensate, and isophthalic acid/bis(3-methyl aminocyclohexyl)methane/ω-laurolactam polycondensate.

A preferred specific example of the additional polyamide resins (A-3) is one composed of an aliphatic diamine, and 40 to 95 mol % of terephthalic acid component units and 5 to 60 mol % of isophthalic acid component units. Preferred examples of the combinations of the monomer components for constituting the additional polyamide resin (A-3) include an equimolar salt of hexamethylenediamine and terephthalic acid, and an equimolar salt of hexamethylenediamine and isophthalic acid.

The additional polyamide resin (A-3) is preferably a copolymer that includes 60 to 99 wt % of units derived from monomer components including an aliphatic diamine, isoph-thalic acid and terephthalic acid, and 1 to 40 wt % of units from an aliphatic polyamide component.

The relative viscosity of the additional polyamide resin (A-3) is not particularly limited, but is preferably the same as the value described hereinabove with respect to the aliphatic homopolyamide resin (A-1) or the aliphatic copo-lyamide resin (A-2).

A production apparatus and a polymerization method for the additional polyamide resin (A-3) include those similar to the production apparatus and the polymerization method described hereinabove with respect to the aliphatic homopo-lyamide resin (A-1).

The additional polyamide resins (A-3) may be used singly, or two or more may be used in combination.

Preferred Embodiment

For the reason that the advantageous effects of the present invention may be enhanced efficiently, the polyamide resins (A) preferably consist of the aliphatic homopolyamide resin (A-1) and the aliphatic copolyamide resin (A-2).

<<Impact Modifiers (B)>>

The polyamide resin composition includes an impact modifier (B). Examples of the impact modifiers (B) include rubbery polymers. The impact modifier (B) preferably has a flexural modulus of 500 MPa or less as measured in accor-dance with ASTM D-790.

Examples of the impact modifiers (B) include (ethylene and/or propylene)/α-olefin copolymers, and (ethylene and/or propylene)/(α,β-unsaturated carboxylic acid and/or α,β-unsaturated carboxylic acid ester) copolymers. The impact modifier (B) is preferably an ethylene/α-olefin copolymer.

The (ethylene and/or propylene)/α-olefin copolymer is a polymer obtained by copolymerizing ethylene and/or pro-pylene with a C3 or higher α-olefin.

Examples of the C3 or higher α-olefins include propylene, 1-butene, 1-pentene, 1-hexene, 1-heptene, 1-octene, 1-non-ene, 1-decene, 1-undecene, 1-dodecene, 1-tridecene, 1-tet-radecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene.

The copolymer may include an additional comonomer, for example, a polyene such as a nonconjugated diene. Examples of the nonconjugated dienes include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatiene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropylidene-2-norbornene, 2,3-diisopropylidene-5-norbornene, 2-ethylidene-3-isopropylidene-5-norbornene and 2-propenyl-2,5-norbornadiene.

The (ethylene and/or propylene)/($\alpha,\beta$-unsaturated carboxylic acid and/or $\alpha\beta$-unsaturated carboxylic acid ester) copolymer is a polymer obtained by copolymerizing ethylene and/or propylene with an $\alpha,\beta$-unsaturated carboxylic acid monomer and/or an $\alpha,\beta$-unsaturated carboxylic acid ester monomer. Examples of the $\alpha,\beta$-unsaturated carboxylic acid monomers include acrylic acid and methacrylic acid. Examples of the $\alpha,\beta$-unsaturated carboxylic acid ester monomers include methyl esters, ethyl esters, propyl esters, butyl esters, pentyl esters, hexyl esters, heptyl esters, octyl esters, nonyl esters and decyl esters of $\alpha,\beta$-unsaturated carboxylic acids.

The (ethylene and/or propylene)/$\alpha$-olefin copolymers and the (ethylene and/or propylene)/($\alpha,\beta$-unsaturated carboxylic acid and/or $\alpha,\beta$-unsaturated carboxylic acid ester) copolymers used as the impact modifiers (B) may be modified with a carboxylic acid and/or a derivative thereof. The impact modifiers (B) are preferably (ethylene and/or propylene)/$\alpha$-olefin copolymers and (ethylene and/or propylene)/($\alpha,\beta$-unsaturated carboxylic acid and/or $\alpha,\beta$-unsaturated carboxylic acid ester) copolymers that are each acid-modified with, for example, an unsaturated carboxylic acid or an acid anhydride thereof. When the impact modifier (B) is such a copolymer that is acid-modified with, for example, an unsaturated carboxylic acid or an acid anhydride thereof, the molecule thereof contains a functional group having affinity for the polyamide resins (A).

Examples of the functional groups having affinity for the polyamide resins (A) include carboxyl groups, acid anhydride groups, carboxylic acid ester groups, carboxylic acid metal salts, carboxylic imide groups, carboxylic amide groups and epoxy groups.

Examples of the compounds that contain a functional group having affinity for the polyamide resins (A), namely, the carboxylic acids and derivatives thereof include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate. Maleic anhydride is preferable as the compound that contains a functional group having affinity for the polyamide resins (A).

The content of the acid anhydride groups in the impact modifier (B) is not particularly limited, but is preferably more than 25 μmol/g and less than 200 μmol/g, more preferably more than 25 μmol/g and less than 150 μmol/g, still more preferably more than 25 μmol/g and less than 110 μmol/g, further preferably more than 25 μmol/g and less than 100 μmol/g, particularly preferably 35 μmol/g or more and less than 95 μmol, and most preferably 40 to 90 μmol/g. When the content is more than 25 μmol/g, the composition that is obtained exhibits a high melt viscosity and can attain a target wall thickness dimension when being blow molded. When the content is less than 200 μmol/g, the composition has a melt viscosity that is not excessively high and can be shaped favorably with less load on the extruder. The content of the acid anhydride groups in the impact modifier (B) is measured by neutralization titration of a sample solution prepared with toluene and ethanol, against 0.1 N KOH ethanol solution using phenolphthalein as an indicator.

In the case where two or more kinds of the impact modifiers (B) having different contents of acid anhydride groups are used, the content of acid anhydride groups in the total of the impact modifiers (B) is preferably measured by neutralization titration of a sample solution prepared with toluene and ethanol, against 0.1 N KOH ethanol solution using phenolphthalein as an indicator. When, however, the respective contents of acid anhydride groups and the mixing ratio of the impact modifiers are known, the content of acid anhydride groups in the impact modifiers (B) may be determined by multiplying each of the contents of acid anhydride groups by the mixing ratio and combining the products to give the average value.

The impact modifier (B) preferably has an MFR of 0.1 to 10.0 g/10 min as measured at a temperature of 230° C. under a load of 2160 g in accordance with ASTM D1238. This range ensures that the composition will be extrusion molded with less instability of the parison shape during blow molding and tends to give a molded body having a more uniform thickness, and also ensures that the parison will have a not excessively large drawdown and good blow moldability tends to be obtained.

The impact modifiers (B) may be used singly, or two or more may be used in combination.

Preferred Embodiment

The impact modifier (B) preferably contains a functional group having affinity for the polyamide resins (A).

<<Inorganic Compounds (C)>>

The polyamide resin composition includes an inorganic compound (C). Examples of the inorganic compounds (C) include metal halides (C-1) and inorganic compounds (C-2) other than metal halides.

The metal halides (C-1) are compounds of a halogen and a metal. Examples of the halogens include fluorine, chlorine, bromine and iodine. Examples of the metals include Group 1 elements (alkali metals), Group 2 elements (alkaline earth metals), and Group 3 to Group 12 elements (for example, transition metals). The metal in the metal halide is preferably a metal of a Group 1 element (alkali metal) or a Group 11 element (copper group).

Examples of the metal halides in which the metal is a Group 1 element (an alkali metal) include potassium iodide, potassium bromide, potassium chloride, sodium iodide and sodium chloride. Examples of the metal halides in which the metal is a Group 11 element (a copper group metal) include cuprous chloride, cupric chloride, cuprous bromide, cupric bromide, cuprous iodide and cupric iodide.

The metal halide (C-1) is particularly preferably cuprous iodide.

Examples of the inorganic compounds (C-2) other than metal halides include metals, metal oxides, metal hydroxides, metal nitrides, metal phosphates, metal phosphites, metal carbonates, metal silicates, metal titanates, metal borates, metal sulfates and metal nitrates. Specific examples of the inorganic compounds (C-2) other than metal halides include talc, mica, synthetic mica, glass flakes, non-swelling mica, fullerene, carbon nanotubes, carbon black, graphite, metal foils, ceramic beads, clay, sericite, zeolite, bentonite, aluminum hydroxide, dolomite, kaolin, silica, finely divided silicic acid, feldspar powder, potassium titanate, Shirasu balloon, calcium carbonate, magnesium carbonate, barium sulfate, calcium oxide, aluminum oxide, titanium oxide, magnesium oxide, aluminum silicate, silicon oxide, magnesium hydroxide, gypsum, novaculite, dawsonite, white clay, glass fibers, carbon fibers, graphite fibers, metal fibers, potassium titanate whiskers, aluminum borate whiskers, magnesium-based whiskers, silicon-based whiskers, wollastonite, sepiolite, slag fibers, Zonolite, ellestadite, gypsum fibers, silica fibers, silica-alumina fibers, zirconia fibers, boron nitride fibers, silicon nitride fibers and boron fibers.

To attain a further reduction in gas permeability, the inorganic compound (C-2) other than metal halides is preferably talc, mica, synthetic mica, glass flakes or non-swelling mica, and is particularly preferably talc.

<Characteristics of Inorganic Compounds (C)>

When the inorganic compound (C) is the metal halide (C-1), the shape thereof is not particularly limited.

When the inorganic compound (C) is the inorganic compound (C-2) other than metal halides, the average particle size thereof is preferably 2 to 18 μm to attain higher gas barrier properties, and is more preferably 5 to 16 μm, and particularly preferably 10 to 14 μm. In the present specification, the average particle size is the average particle size measured by a particle size distribution measurement method based on the laser diffraction/scattering technique. For example, the measurement device used in the particle size distribution measurement method may be laser diffraction-type grain size distribution analyzer SALD-7000 manufactured by Shimadzu Corporation. When the inorganic compound other than metal halides is a commercial product, the average particle size of the inorganic compound is the value described in the catalog of the commercial product.

The inorganic compound (C) may be a combination of a single, or two or more compounds of the respective types. That is, the inorganic compound (C) may be a combination of one or more kinds of the metal halides (C-1), and one or more kinds of the inorganic compounds (C-2) other than metal halides.

Preferred Embodiment

To impart appropriate mechanical characteristics to a molded body of the polyamide resin composition, the inorganic compound (C) preferably is a combination of the metal halide (C-1) and the inorganic compound (C-2) other than metal halides, more preferably comprises the metal halide and talc, and is particularly preferably a combination of the metal halide and talc.

<<Additional Components>>

The polyamide resin composition may include additional components as long as the advantageous effects of the present invention are not impaired. Examples of the additional components include functionality-imparting agents such as plasticizers, heat resistant materials, foaming agents, weathering agents, organic crystal nucleating agents, organic antioxidants, crystallization accelerators, mold release agents, lubricants, antistatic agents, flame retardants, flame retardant aids, pigments and dyes. The additional components exclude the polyamide resins (A), the impact modifiers (B) and the inorganic compounds (C).

<<Contents>>

The content of the polyamide resins (A) with respect to 100 parts by weight of the total of the polyamide resin composition is preferably 50 parts by weight or more and less than 100 parts by weight to ensure that the composition will exhibit good gas barrier properties, and is preferably 55 to 99 parts by weight, and particularly preferably 60 to 98 parts by weight. The total content of the aliphatic homopolyamide resin (A-1) and the aliphatic copolyamide resin (A-2) with respect to 100 parts by weight of the total of the polyamide resins (A) is preferably 60 to 100 parts by weight to ensure that the composition will exhibit good gas barrier properties and excellent low-temperature impact resistance, and is more preferably 90 to 100 parts by weight, and particularly preferably 95 to 100 parts by weight.

The content of the aliphatic copolyamide resin (A-2) with respect to 100 by weight of the total of the aliphatic homopolyamide resin (A-1) and the aliphatic copolyamide resin (A-2) is preferably 5.00 to 40.00 parts by weight, more preferably 24.00 to 24.70 parts by weight, still more preferably 24.10 parts by weight or more and less than 24.70 parts by weight, and particularly preferably 24.20 to 24.68 parts by weight. This range ensures that excellent low-temperature impact resistance will be obtained and a molded article will exhibit good processability. When the polyamide resins (A) consist of the aliphatic homopolyamide resin (A-1) and the aliphatic copolyamide resin (A-2), the content described above is the content of the aliphatic copolyamide resin (A-2) with respect to 100 parts by weight of the total of the polyamide resins (A).

The content of the inorganic compound (C) with respect to 100 parts by weight of the impact modifier (B) is 1.60 to 3.00 parts by weight. This range ensures that the impact modifier (B) will effectively impart impact resistance and the addition of the impact modifier will not alter characteristics inherent to polyamide resins such as strength and heat resistance, and also ensures that the inorganic compound (C) will impart gas barrier effects highly efficiently. If the content of the inorganic compound (C) is less than 1.60 parts by weight with respect to 100 parts by weight of the impact modifier (B), the amount of the inorganic compound (C) relative to the impact modifier (13) is so small that poor gas barrier properties result. The content of the inorganic compound (C) with respect to 100 parts by weight of the impact modifier (B) is preferably 1.65 to 3.00 parts by weight, and particularly preferably 1.70 to 3.00 parts by weight.

The contents of the impact modifier (B) and of the inorganic compound (C) in the polyamide resin composition are not particularly limited as long as the content described above of the inorganic compound (C) with respect to 100 parts by weight of the impact modifier (B) is satisfied.

To ensure gas barrier properties and a favorable nominal tensile strain at break at a low temperature, the content of the impact modifier (B) with respect to 100 parts by weight of the total of the polyamide resin composition is preferably 5 to 30 parts by weight, more preferably 5 to 25 parts by weight, and particularly preferably 7 to 20 parts by weight. The polyamide resin composition may be placed into an autoclave and may be treated using hydrochloric acid at 150° C. for 16 hours to hydrolyze the polyamide components, and the undecomposed component may be recovered as the impact modifier (B) component.

To improve gas barrier properties and the nominal tensile strain at break at a low temperature, the content of the inorganic compound (C) with respect to 100 parts by weight of the total of the polyamide resin composition is preferably 0.01 to 0.5 parts by weight, more preferably 0.01 to 0.4 parts by weight, and particularly preferably 0.02 to 0.3 parts by weight. When the inorganic compound (C) is a combination of the metal halide (C-1) and the inorganic compound (C-2) other than metal halides, the content of the metal halide (C-1) with respect to 100 parts by weight of the total of the inorganic compounds (C) is more preferably 10 to 90 parts by weight, and particularly preferably 30 to 85 parts by weight from the point of view of gas barrier properties.

[Methods for Producing Polyamide Resin Compositions]

The polyamide resin composition may be produced by any method without limitation. For example, the following methods may be adopted. The polyamide resins (A), the impact modifier (B), the inorganic compound (C) and the additional components may be mixed together using a commonly known melt kneading device such as a single-screw or twin-screw extruder, a Banbury mixer, a kneader or a mixing roll. Specifically, for example, all the ingredients may be mixed together and then melt kneaded using a twin-screw extruder. Alternatively, some of the ingredients may be mixed together and then melt kneaded, and further the rest of the ingredients may be added and melt kneaded. Still alternatively, some of the ingredients may be mixed together and then melt kneaded while mixing the rest of the ingredients using a side feeder. The production methods are not limited to those described above.

[Use Applications of Polyamide Resin Compositions]

The polyamide resin composition may be used for the production of molded articles using known methods without limitation. Specifically, the polyamide resin composition may be used for the production of injection molded articles by injection molding, the production of blow molded articles by blow molding, or the production of extrusion molded articles by extrusion molding. In particular, the polyamide resin composition of the present invention is suited for the production of blow molded articles by blow molding and the production of extrusion molded articles by extrusion molding. The method for producing a blow molded article from the polyamide resin by blow molding generally includes forming a parison using a usual blow molding machine and subsequently performing blow molding. The resin temperature at the time of parison formation is preferably in the range of temperatures higher than the melting point of the polyamide resin composition by 10° C. to 70° C.

The method for producing an extrusion molded article from the polyamide resin by extrusion molding generally includes co-extruding the resin with a polyolefin such as polyethylene or other thermoplastic resin, and subsequently performing blow molding to produce a multilayer structure. Here, an adhesive layer may be provided between the polyamide resin composition layer and the layer of the thermoplastic resin such as the polyolefin. When the molded article is a multilayer, structure, the polyamide resin composition of the present invention may be used in any of an outer layer and an inner layer.

The injection molded articles formed by injection molding, the blow molded articles formed by blow molding, and the extrusion molded articles formed by extrusion molding may be suitably used in various applications including, although not limited to, automobile parts such as spoilers, air intake ducts, intake manifolds, resonators, fuel tanks, gas tanks, hydraulic oil tanks, fuel filler tubes, fuel delivery pipes, and other various hoses, tubes and tanks, power tool housings, and machinery parts such as pipes, as well as electric/electronic parts, household/office supplies, building material-related parts and furniture parts, such as tanks, tubes, hoses and films.

The polyamide resin composition has excellent gas barrier properties and thus is suitably used as a molded body that is in contact with a gas, for example, a tank, a tube, a hose or a film that is in contact with a gas.

The type of the gas is not particularly limited. Examples of the gases include hydrogen, nitrogen, oxygen, helium, methane, butane and propane. Low-polarity gases are preferable, and hydrogen and nitrogen are particularly preferable.

EXAMPLES

Hereinbelow, the present invention will be described in greater detail by presenting Examples and Comparative Examples. However, it should be construed that the scope of the present invention is not limited to such Examples. The components used in Examples and Comparative Examples, and the methods used to evaluate properties of molded articles are described below.

[Hydrogen Gas Permeability Coefficient]

Various types of test pieces were prepared by injection molding and were used to acquire data of mechanical properties.

In accordance with JIS K7126-1, a hydrogen gas permeability test was performed by a gas chromatography method with respect to a 2 mm thick test piece at 15° C. or 55° C., 1 atm and 0% RH. The measurement devices that were used were GTR-30XAD (manufactured by GTR TEC Corporation) and G6800T•F (manufactured by Yanaco Technical Science). The test piece was produced under the melt kneading conditions and the injection molding conditions described later.

[Nominal Tensile Strain at Break]

A 4.0 mm thick ISO Type-A test piece was tested at room temperature (23° C.) and −40° C. in accordance with ISO 527-1 and 2.

The nominal tensile strain at break at a low temperature (−40° C.) was evaluated in accordance with the following criteria.

o: After yield, the test piece stretched sufficiently and fractured.

x: After yield, the test piece fractured immediately.

[Components Used]

1. Polyamide Resins (A)

(1) Aliphatic Homopolyamide Resin (A-1)

PA6: Polyamide 6 (manufactured by Ube Industries Ltd., relative viscosity=2.98)

13

(2) Aliphatic Copolyamide Resin (A-2)

PA6/66: Polyamide 6/66 (manufactured by Ube Industries, Ltd., relative viscosity=4.05)

The relative viscosities of the aliphatic homopolyamide resin (A-1) and the aliphatic copolyamide resin (A-2) used in Examples are values measured with respect to a 1 wt % solution in 96% sulfuric acid at 25° C. in accordance with JIS K 6920.

2. Impact Modifier (B)

(1) TAFMER MH5020: Maleic anhydride-modified ethylene/butylene copolymer (TAFMER (registered trademark) MH5020 manufactured by Mitsui Chemicals, Inc., density ρ=0.86)

3. Inorganic Compounds (C)

(1) Metal Halide (C-1)

CuI—KI mixture (weight ratio 1:6)

CuI: Cuprous iodide (manufactured by ISE CHEMICALS CORPORATION)

KI: Powdered potassium iodide (Mitsui Fine Chemicals, Inc.)

14

(2) Inorganic Compound (C-2) Other than Metal Halides

Talc: KHP-400 (manufactured by HAYASHI KASEI CO., LTD., average particle size: 11 μm (catalog value))

Examples 1 to 3 and Comparative Examples 1 and 2

The components described in Table 1 were melt-kneaded under the melt-kneading conditions described below to give a target polyamide resin composition as pellets. Next, the pellets were formed into various test pieces, which were then tested to evaluate properties.

<Melt-Kneading Conditions>

Twin-screw extruder TEX-44 was used.

Cylinder diameter: 44 mm

L/D: 35

Screw rotational speed: 120 rpm

<Injection Molding Conditions>

Cylinder temperature: 270° C.

Mold temperature: 80° C.

Average injection speed in the mold: 50 mm/sec

Cooling time: 5 seconds

The results obtained are described in Table 1.

TABLE 1

| | | | | Example 1 | Example 2 | Example 3 | Comparative Example 1 | Comparative Example 2 |
|---|---|---|---|---|---|---|---|---|
| Polyamide resins | (A-1) | PA6 | wt % | 62.20 | 67.70 | 63.00 | 60.70 | 79.00 |
| (A) | (A-2) | PA6/66 | wt % | 20.00 | 22.00 | 20.60 | 20.00 | 20.70 |
| Impact modifier (B) | (B) | Tafmar MH5020 | wt % | 17.50 | 10.00 | 16.00 | 19.00 | 0.00 |
| Inorganic | (C-1) | Cul-KI mixture | wt % | 0.25 | 0.25 | 0.30 | 0.25 | 0.25 |
| compounds | (C-2) | Talc | wt % | 0.05 | 0.05 | 0.10 | 0.05 | 0.05 |
| (C) | | | | | | | | |
| | | | Total | 100.00 | 100.00 | 100.00 | 100.00 | 100.00 |
| Content of the inorganic compounds (C) with respect to 100 parts by weight of the impact modifier (B) | | | Parts by weight | 1.71 | 3.00 | 2.50 | 1.58 | — |
| Content of the aliphatic copolyamide resin (A-2) with respect to 100 parts by weight of the total of the aliphatic homopolyamide resin (A-1) and the aliphatic copolyamide resin (A-2) | | | Parts by weight | 24.33 | 24.53 | 24.64 | 24.78 | 20.76 |
| Hydrogen gas permeability coefficient | $cm^3 \cdot cm/(cm^2 \cdot s \cdot cmHg)$ | | 15° C., 1 atm | 6.02E−11 | 4.61E−11 | 5.59E−11 | 6.79E−11 | 2.68E−11 |
| | | | 55° C., 1 atm | 3.13E−10 | 2.39E−10 | 3.03E−10 | 3.50E−10 | 1.44E−10 |
| Nominal tensile strain at break | | | −40° C., | ○ | ○ | ○ | ○ | x |

As clear from the results in Table 1, the polyamide resin compositions of Examples can give molded articles having a low hydrogen gas permeability and an excellent nominal tensile strain at break.

The resin composition of Comparative Example 1 had a high hydrogen gas permeability coefficient because the content of the inorganic compounds (C) was less than 1.60 parts by weight with respect to 100 parts by weight of the impact modifier (B).

The resin composition of Comparative Example 2 did not contain the impact modifier (B) and was consequently poor in nominal tensile strain at break at a low temperature.

The invention claimed is:

1. A polyamide resin composition comprising polyamide resins (A), an impact modifier (B) and an inorganic compound (C), wherein the polyamide resins (A) include an aliphatic homopolyamide resin (A-1) and an aliphatic copolyamide resin (A-2), the content of the inorganic compound (C) with respect to 100 parts by weight of the impact modifier (B) is 1.60 to 3.00 parts by weight, the impact modifier (B) is one or more kinds selected from the group consisting of (ethylene and/or propylene)/α-olefin copolymers, and (ethylene and/or propylene)/(α, β-unsaturated carboxylic acid and/or α,β-unsaturated carboxylic acid ester) copolymers, and the inorganic compound (C) is a combination of a metal halide (C-1) and an inorganic compound (C-2) other than metal halides, and the content of the metal halide (C-1) with respect to 100 parts by weight of the inorganic compounds (C) is 10 to 90 parts by weight.

2. The polyamide resin composition according to claim 1, wherein the content of the aliphatic copolyamide resin (A-2) with respect to 100 parts by weight of the total of the aliphatic homopolyamide resin (A-1) and the aliphatic copolyamide resin (A-2) is 5.00 to 40.00 parts by weight.

3. The polyamide resin composition according to claim 1, wherein the inorganic compound (C) comprises a metal halide and talc.

4. The polyamide resin composition according to claim 1, wherein the aliphatic homopolyamide resin (A-1) has a relative viscosity of 1.8 to 5.0 as measured with respect to a 1 wt % solution in 96% sulfuric acid at 25° C. in accordance with JIS K 6920.

5. The polyamide resin composition according to claim 1, wherein the aliphatic copolyamide resin (A-2) has a relative viscosity of 1.8 to 5.0 as measured with respect to a 1 wt % solution in 96% sulfuric acid at 25° C. in accordance with JIS K 6920.

6. The polyamide resin composition according to claim 1, wherein the metal halide (C-1) is a combination of a metal halide of Group 1 element and a metal halide of a Group 11 element.

7. The polyamide resin composition according to claim 1, wherein the inorganic compound (C-2) other than metal halide is one or more kinds selected from the group consisting of talc, mica, synthetic mica, glass flakes, non-swelling mica, fullerene, carbon nanotubes, carbon black, graphite, metal foils, ceramic beads, clay, sericite, zeolite, bentonite, aluminum hydroxide, dolomite, kaolin, silica, finely divided silicic acid, feldspar powder, potassium titanate, Shirasu balloon, calcium carbonate, magnesium carbonate, barium sulfate, calcium oxide, aluminum oxide, titanium oxide, magnesium oxide, aluminum silicate, silicon oxide, magnesium hydroxide, gypsum, novaculite, dawsonite, white clay, glass fibers, carbon fibers, graphite fibers, metal fibers, potassium titanate whiskers, aluminum borate whiskers, magnesium-based whiskers, silicon-based whiskers, wollastonite, sepiolite, slag fibers, Zonolite, ellestadite, gypsum fibers, silica fibers, silica-alumina fibers, zirconia fibers, boron nitride fibers, silicon nitride fibers and boron fibers.

8. The polyamide resin composition according to claim 1, wherein the content of the metal halide (C-1) with respect to 100 parts by weight of the total of the polyamide resin composition is 0.25 to 0.30 parts by weight.

9. The polyamide resin composition according to claim 1, wherein the content of the inorganic compound (C-2) other than metal halides with respect to 100 parts by weight of the total of the polyamide resin composition is 0.05 to 0.10 parts by weight.

10. The polyamide resin composition according to claim 1, wherein the average particle size of the inorganic compound (C-2) other than metal halides is 2 to 18 μm.

11. The polyamide resin composition according to claim 1, wherein the inorganic compound (C-2) other than metal halides is talc, and the average particle size of the talc is 10 to 14 μm.

12. A molded article comprising the polyamide resin composition according to claim 1.

13. The molded article according to claim 12, which is placed in contact with a gas.

* * * * *